United States Patent [19]
Takahashi

[11] Patent Number: 6,134,391
[45] Date of Patent: Oct. 17, 2000

[54] BATTERY RESIDUAL-POWER CHECKING APPARATUS

[75] Inventor: Hiroyuki Takahashi, Tochigi, Japan

[73] Assignee: Asahi Kogaku Kogyo Kabushiki Kaisha, Tokyo, Japan

[21] Appl. No.: 09/335,921

[22] Filed: Jun. 18, 1999

[30] Foreign Application Priority Data

Jun. 22, 1998 [JP] Japan ................................. 10-174912

[51] Int. Cl.[7] ............................. G03B 7/26; G08B 21/00; H02J 7/00; G01N 27/416
[52] U.S. Cl. ........................ 396/277; 340/636; 320/106; 320/136; 324/426
[58] Field of Search ................................... 396/277, 278, 396/279; 340/636; 320/106, 136; 324/435, 436, 426

[56] References Cited

U.S. PATENT DOCUMENTS

| | | | |
|---|---|---|---|
| 4,792,762 | 12/1988 | Shiina et al. | 396/277 X |
| 5,105,180 | 4/1992 | Yamada et al. | 340/636 |
| 5,162,721 | 11/1992 | Sato | 320/136 |
| 5,406,266 | 4/1995 | Mino et al. | 340/636 |
| 5,438,248 | 8/1995 | Hyuck | 320/106 |
| 5,773,978 | 6/1998 | Becker | 324/436 X |
| 5,804,894 | 9/1998 | Leeson et al. | 320/106 X |
| 5,831,435 | 11/1998 | Troy | 324/426 |
| 5,850,134 | 12/1998 | Oh et al. | 320/106 |
| 5,912,544 | 6/1999 | Miyakawa et al. | 320/106 |

*Primary Examiner*—W. B. Perkey
*Attorney, Agent, or Firm*—Greenblum & Bernstein P.L.C.

[57] ABSTRACT

Disclosed is a battery residual-power checking apparatus including: a detecting device for detecting a type of battery accommodated in a camera a battery from a plurality of battery types prepared in advance; a load applying device for applying a load to the detected battery, a magnitude of the load being determined in advance in accordance with the type of the detected battery; a voltage measuring device for measuring an output voltage of the detected battery while the load applying device applies the load to the detected battery; and a battery residual-power determining device for determining the remaining power of the detected battery in accordance with the output voltage measured by the voltage measuring device and the type of the detected battery.

11 Claims, 10 Drawing Sheets

BATTERY RESIDUAL-POWER CHECKING APPARATUS

BACKGROUND OF THE INVENTION

1. Field of the Invention

The present invention relates to an apparatus for checking the remaining power of a battery, more specifically relates to such a battery checking apparatus which can accurately measure the remaining power of different types of batteries.

2. Description of the Related Art

Most of the cameras produced in recent years are motor-driven cameras. Namely, in the focusing operation, winding/rewinding operations and other operations of the camera are carried out using a motor or motors. To this end the battery level is automatically checked upon the main switch of the camera being turned ON so that the camera functions properly without having trouble with shortages in battery power.

A conventional apparatus for checking the remaining power of a battery (i.e., a "battery residual power checking apparatus") that is provided in a motor-driven camera is constructed to check the remaining power of one specified type of battery used as the power source of the camera. Therefore, the time of applying a load to the battery (i.e., the time of connecting the battery with a load resistor), the recovery time of the battery, and the number of times the battery is activated (checked) are each fixed for the one specified type of battery used.

SUMMARY OF THE INVENTION

The primary object of the present invention is to provide a battery residual-power checking apparatus which can accurately measure the remaining power of different types of batteries.

To achieve the object mentioned above, according to an aspect of the present invention, there is provided a battery residual-power checking apparatus including: a detecting device for detecting a type of battery accommodated in a camera a battery from a plurality of battery types prepared in advance; a load applying device for applying a load to the detected battery, a magnitude of the load being determined in advance in accordance with the type of the detected battery; a voltage measuring device for measuring an output voltage of the detected battery while the load applying device applies the load to the detected battery; and a battery residual-power determining device for determining the remaining power of the detected battery in accordance with the output voltage measured by the voltage measuring device and the type of the detected battery.

With above described arrangement, since a load is applied to a battery in accordance with the type of battery detected, and the residual power of the battery is determined by the detected amount of voltage level of the detected battery, the residual power of different types of batteries can be reliably determined.

Preferably, if the battery residual-power determining device determines that the detected battery has run out of power, the load applying device intermittently applies a predetermined load which is set according to the type of battery detected, wherein if the battery level is determined as being empty before the predetermined maximum number times for the load to be applied is attained, the load being applied is stopped; otherwise, the load is applied until the predetermined maximum number of times for the load to be applied is attained.

Preferably, the load applying device includes: a pulse generator for generating a first pulse which corresponds to a load applying time for applying the load to the detected battery by the load applying device and a second pulse which corresponds to a recovery time of the detected battery, wherein the load applying time and the recovery time are determined in advance in accordance with the type of the detected battery; at least one load resistor; a switching device for connecting the detected battery with the above-mentioned at least one load resistor during the first pulse duration which corresponds to the load applying time, and for disconnecting the detected battery from the above-mentioned at least one load resistor during the second pulse duration which corresponds to the recovery time, according to the type of the detected battery.

Preferably, the voltage measuring device measures a terminal voltage of the above-mentioned at least one load resistor while the detected battery is connected with the above-mentioned at least one load resistor, and wherein the battery residual-power determining device determines the remaining power of the detected battery in accordance with the measured terminal voltage.

Preferably, if the battery residual-power determining device determines that the detected battery has run out of power, the pulse generator alternately generates the first pulse and the second pulse repeatedly for a predetermined number of times in accordance with the type of the detected battery, in order for the battery residual-power determining device to confirm whether the detected battery has run out of power.

Preferably, durations of the first pulse and the second pulse are determined in accordance with the type of the detected battery.

The battery residual-power checking apparatus can be incorporated in a camera having a photometering device; wherein the camera includes a switch which operates the photometering device when the switch is turned ON, and wherein the battery residual-power checking apparatus starts operating when the switch is turned ON.

Alternatively, the battery residual-power checking apparatus can be incorporated in a camera, wherein the battery residual-power checking apparatus starts operating when a power switch of the camera is turned ON.

Alternatively, the battery residual-power checking apparatus can be incorporated in a camera, wherein the battery residual-power checking apparatus starts operating when a release switch of the camera is half depressed.

According to another aspect of the present invention, there is provided a camera having a battery residual-power checking apparatus, wherein more than one type of battery being accommodated in the camera, the battery residual-power checking apparatus including: a battery detecting device for detecting a type of battery accommodated in the camera as the power source of the camera; a load applying device for alternately connecting and disconnecting the battery detected by the battery selecting device with at least one load resistor repeatedly by a predetermined number of times, which is determined in accordance with the type of the detected battery; a voltage measuring device for measuring a terminal voltage of the above-mentioned at least one load resistor while the detected battery is connected with the above-mentioned at least one load resistor; and battery residual-power determining device for determining the remaining power of the detected battery in accordance with the terminal voltage and the type of the detected battery.

According to another aspect of the present invention, there is provided a camera having a battery residual-power checking apparatus, wherein a removable battery pack is provided according to the type of battery loaded into the camera, the battery residual-power checking apparatus including: a selecting device which selects the type of battery which has been loaded into the battery pack in the camera; a loading applying device for applying a load to a battery loaded into the battery pack according to a predetermined load set for the type of battery detected by the selecting device; a voltage measuring device for measuring a terminal voltage of at least one load resistor while the detected battery is connected with the above-mentioned at least one load resistor; and a battery residual-power determining device for determining the remaining power of the detected battery in accordance with the terminal voltage and the type of detected battery.

Likewise with the first arrangement described above, residual power of different types of batteries can also be reliably determined in the alternative arrangements.

The present disclosure relates to subject matter contained in Japanese Patent Application No. 10-174912 (filed on Jun. 22, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

An embodiment of a battery residual-power checking apparatus to which the present invention is applied can be incorporated in a camera using a battery. The battery residual-power checking apparatus starts operating to check the remaining power of the battery upon the release button of the camera being half depressed with the main power switch of the camera turned ON. The battery residual-power checking apparatus can accurately measure the remaining power of the battery, depending upon the type of battery used as the power source of the camera. To achieve this, the time of applying a load to the battery (i.e., the time of connecting the battery with load resistors 21 and 22 [load applying device]), the recovery time of the battery (i.e., the time of disconnecting the battery from the load resistors 21 and 22), and the number of times of activating battery (i.e., the number of times of repeatedly and intermittently checking the remaining power of battery) differ depending on the type of battery used as the power source of the camera. Specifically, the battery detected to be used as the power source of the camera is connected with the load resistors 21 and 22 to electrically discharge for a load applying time which is predetermined according to a type of battery used as the power source of the camera. In accordance with the value of the discharge voltage, the remaining power of the battery is measured. As a result of this measurement, in the case where it is determined that the battery has run out (i.e., the battery cannot supply a sufficient power to the camera any longer), the battery is alternately connected and disconnected with the load resistor to repeatedly electrically discharge up to a predetermined number of times in order to confirm whether the battery has run out of power.

Figure 1:
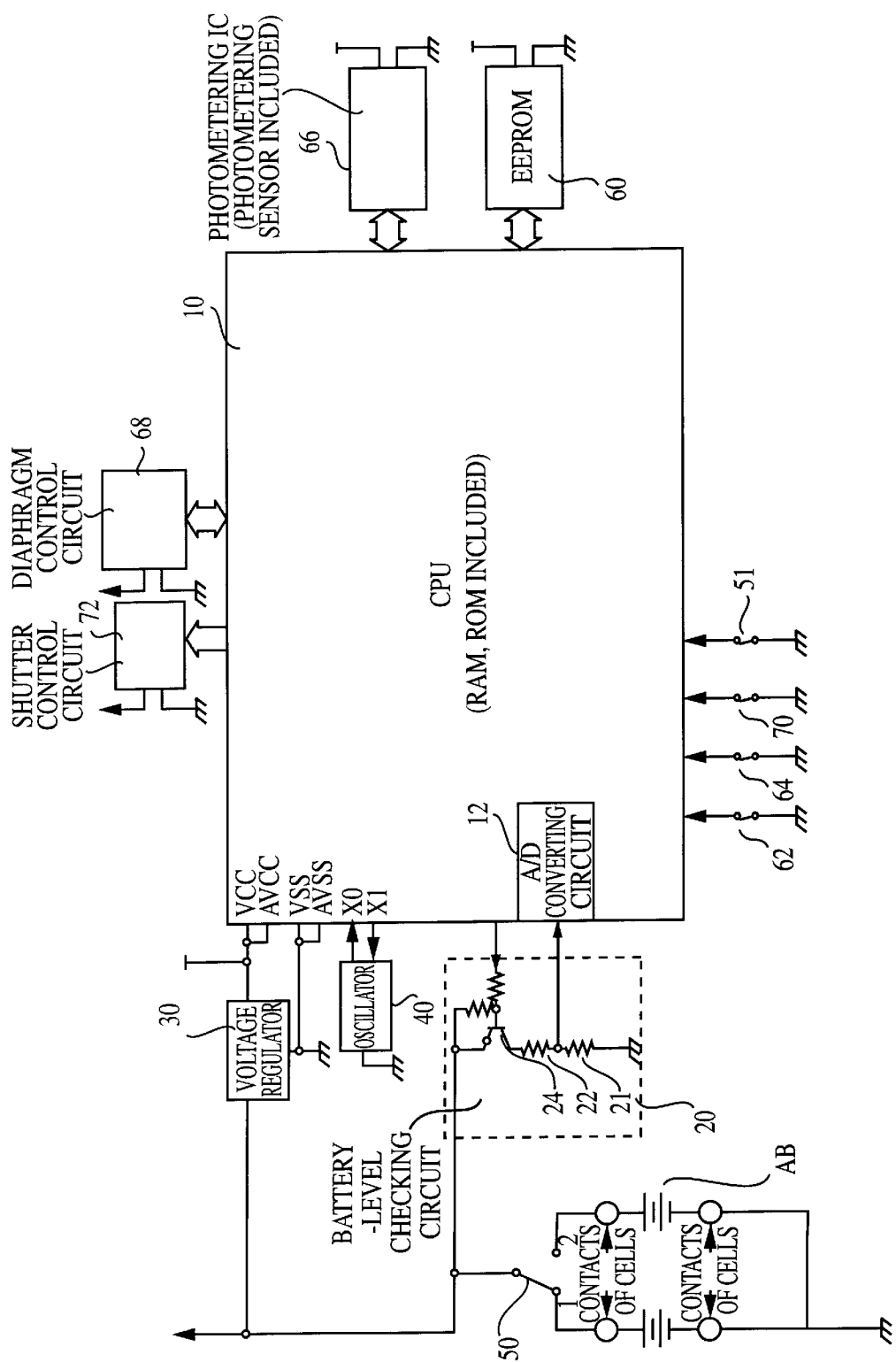
FIG. 1 is a block diagram showing the schematic structure of an embodiment of a battery residual-power checking apparatus to which the present invention is applied.

FIG. 1 shows a block diagram showing the schematic structure of the embodiment of a battery residual-power checking apparatus. The battery residual-power checking apparatus is provided with a CPU 10 which controls the overall operations of the camera. The CPU 10 functions as a device for applying a load to the battery (i.e., connecting the battery with the load resistors 21 and 22), and as a battery residual-power determining device for determining the following: whether the battery still holds sufficient power (i.e., whether the battery level is "NORMAL"), the battery holds a little power (i.e., whether the battery level is "LOW"), or the battery has practically run out of power (i.e., whether the battery level "EMPTY"). The CPU also functions as a pulse generator and as a voltage measuring device.

The battery residual-power checking apparatus is further provided with a battery-level checking circuit 20, a voltage regulator 30, an oscillator 40, and an EEPROM 60, which are all connected to the CPU 10. The battery-level checking circuit 20 is provided with the first load resistor 21, the second load resistor 22 and a switching transistor 24. The battery residual-power checking apparatus is further provided with a selecting switch (selecting device) 50 for selecting either a lithium battery or an alkaline-manganese battery to be used as the power source of the camera, and a battery detecting switch (battery detecting device) 51 for detecting a type of battery which is accommodated in a camera. The battery detecting switch 51 turns ON or OFF depending on whether an alkaline-manganese battery or a lithium battery is accommodated in the camera. When the battery detecting switch 51 turns ON, the selecting switch 50 is simultaneously switched to the alkaline-manganese battery via a contact terminal 2. Likewise, when the battery detecting switch 51 turns OFF, the selecting switch 50 is simultaneously switched to the lithium battery via a contact terminal 1.

A main switch (power switch) 62, a photometering switch 64, photometering IC 66, a diaphragm control circuit 68, a release switch 70 and a shutter control circuit 72 of the camera are all connected to the CPU 10. The photometering switch 64 and the release switch 70 are turned ON when the release button of the camera is half depressed and fully depressed, respectively.

The CPU 10 is provided therein with an A/D converting circuit 12 which functions as a device for detecting the terminal voltage of the first load resistor 22 of the battery-level checking circuit 20. Subsequently, the A/D converting circuit 12 converts the terminal voltage of the first load resistor 22 into a corresponding digital value. The CPU 10 determines the remaining power of the battery in accordance with the digital value output from the A/D converting circuit 12.

Either the lithium battery LB (e.g., CR2, CR123 or 2CR5) or the alkaline-manganese battery AB (e.g., AA-size or AAA-size cell) is selectively used as the power source of the camera. The battery-level checking circuit 20 functions as a device for applying a load to the battery. The battery-level checking circuit 20 makes either the lithium battery LB or the alkaline-manganese battery AB, which is selected by the selecting switch 50, electrically discharge via the first and second load resistors 21 and 22, which are connected in series. The switching transistor (switching device) 24 of the battery-level checking circuit 20 turns ON and OFF in accordance with the pulses of a desired time of applying a load to the battery and a desired recovery time of the battery which are output from the CPU 10. While the switching transistor 24 is ON, either the lithium battery LB or the alkaline-manganese battery AB (selected by the selecting switch 50) is connected to the first and second load resistors 21 and 22, so that current flows to the first and second load resistors 21 and 22. The A/D converting circuit 12 converts the analogue value of the terminal voltage between the two terminals of the first load resistor 21 into a corresponding digital value, and the CPU 10 determines the remaining power of battery in accordance with the digital value.

A constant voltage is always supplied to the CPU 10 and other circuits via the voltage regulator 30.

The oscillator 40 generates clock pulses to operate the CPU 10. Based on the clock pulses as a reference, the CPU 10 determines and measures the amount of time in an internal timer thereof to generate pulses which are to be supplied to the switching transistor 24 and pulses which are necessary for the converting operations of the A/D converting circuit 12. Accordingly, the CPU 10 together with the oscillator 40 functions as a pulse generator.

The selecting switch 50 is actuated to select either the lithium battery LB or the alkaline-manganese battery AB to be used as the power source of the camera. In this particular embodiment, the lithium battery LB is selected to be used as the power source of the camera if the selecting switch 50 is switched to contact terminal 1 which is connected to the lithium battery LB, and the alkaline-manganese battery AB is selected to be used as the power source of the camera if the selecting switch 50 is switched to contact terminal 2 which is connected with the alkaline-manganese battery AB. The selecting switch 50 is interconnected with the battery select switch 51 so that the selecting switch 50 changes the connection between the two terminals 1 and 2 each time the battery select switch 51 is operated. In this particular embodiment, four AA-size alkaline-manganese cells (1.5 volts×4=6 volts) and two lithium cells (3 volts×2=6 volts) are accommodated in the camera and are selectively used as the power source of the camera.

Various data related to the time of applying a load to the battery, the recovery time of the battery, and the number of times of activating battery to operate the battery residual-power checking apparatus are stored in the EEPROM 60. The main switch 62 functions as a power switch of the camera which is manually operated by the user of the camera. When the photometering switch 64 is turned ON (i.e., when the release button of the camera is half-depressed), the CPU 10 commands the photometering IC 66 (which includes a photometering sensor) to measure the object brightness so as to determine an aperture value and a shutter speed for the optimum exposure. When the release switch 70 is turned ON (i.e., when the release button of the camera is fully depressed), the CPU 10 commands the diaphragm control circuit 68 to operate in accordance with the determined aperture value to adjust the diaphragm of the camera, and further commands the shutter control circuit 72 to operate in accordance with the determined shutter speed, to release the shutter at an optimum shutter speed.

Operation of the battery residual-power checking apparatus of the present embodiment will be hereinafter discussed with reference to the flow chart shown in FIG. 2. When the main switch 62 of the camera is turned ON, an initializing operation in which the CPU 10 and all the circuits connected to the CPU 10 are reset is performed (step S1).

When the release button of the camera is half depressed (when the photometering switch 64 is turned ON), a battery-level checking operation for checking the remaining power of battery is performed (steps S2 and S3).

If it is determined in the battery-level checking operation at step S3 that the battery level is still NORMAL, the CPU 10 commands the photometering IC 66 to measure object brightness (step S4), and subsequently, the CPU 10 determines an aperture value and a shutter speed for the optimum exposure (step S5). Thereafter, an object distance is measured and an AF (autofocusing) operation is performed in accordance with the measured object distance (steps S6 and S7). Thereafter, in the case where it is determined that an in-focus state is obtained, it is checked whether the release button is half depressed (step S9). Control returns to step S4 if it is determined at step S9 that the release button is not half depressed. Conversely, control proceeds to step S10 if the release button is half depressed. It is determined at step S10 whether the release button is fully depressed. If it is determined at step S10 that the release button is fully depressed, the CPU 10 controls the diaphragm control circuit 68 to actuate the diaphragm so that optimum exposure is obtained, and further commands the shutter control circuit 72 to release the shutter at an optimum shutter speed.

Figure 2:
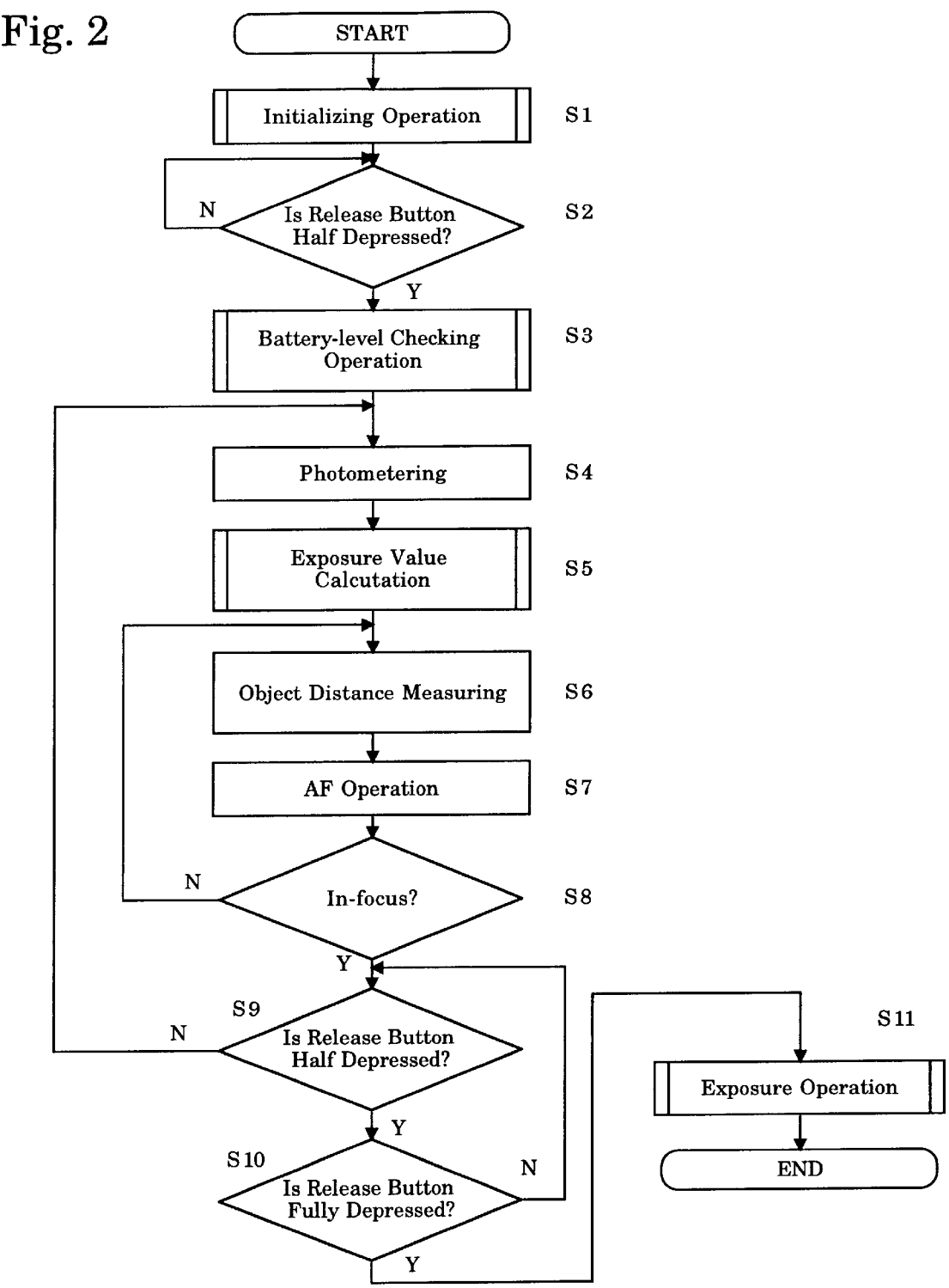
FIG. 2 is a main flow chart illustrating the operation of the embodiment of battery residual-power checking apparatus.
Figure 3:
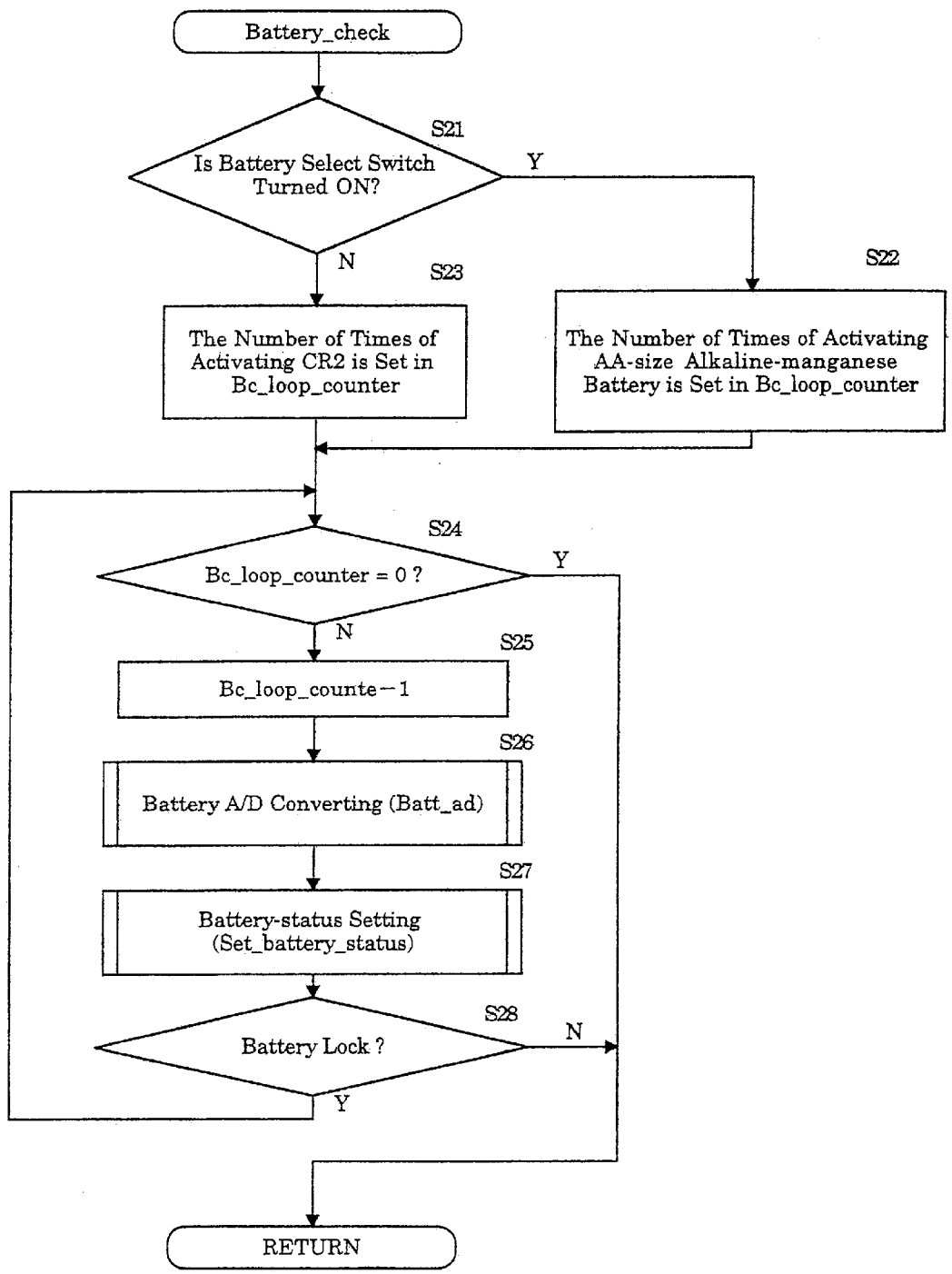
FIG. 3 is a flow chart illustrating the battery-level checking operation shown in FIG. 2.

FIG. 3 shows a flow chart showing the battery-level checking operation at step S3 shown in FIG. 2. In this operation, it is determined whether the battery select switch 51 is turned ON or OFF (step S21). If it is determined that the battery select switch 51 is ON, the selecting switch 50, which is inter-connected with the battery select switch 51, connects to terminal 2, and the CPU 10 sets the predetermined number of times the alkaline-manganese battery AB is to be activated (checked) in the bc loop counter of the CPU 10 (step S22) according to a predetermined number (of times for activating the alkaline-manganese battery AB) pre-stored in the EEPROM 60. However, if it is determined that the battery select switch 51 is OFF, the selecting switch 50 connects to terminal 1, and the CPU 10 sets the predetermined number of times the lithium battery LB is to be activated (checked) in the bc loop counter (step S23) according to a predetermined number (of times of activating the lithium battery LB) also pre-stored in the EEPROM 60.

In the present embodiment, the predetermined number of times the alkaline-manganese battery AB is activated (checked) is fifty, while the predetermined number of times the lithium battery LB is activated (checked) is two. The reason for the difference in these numbers is due to the difference in the battery characteristics of the alkaline-manganese battery AB and the lithium battery LB.

Figure 9:
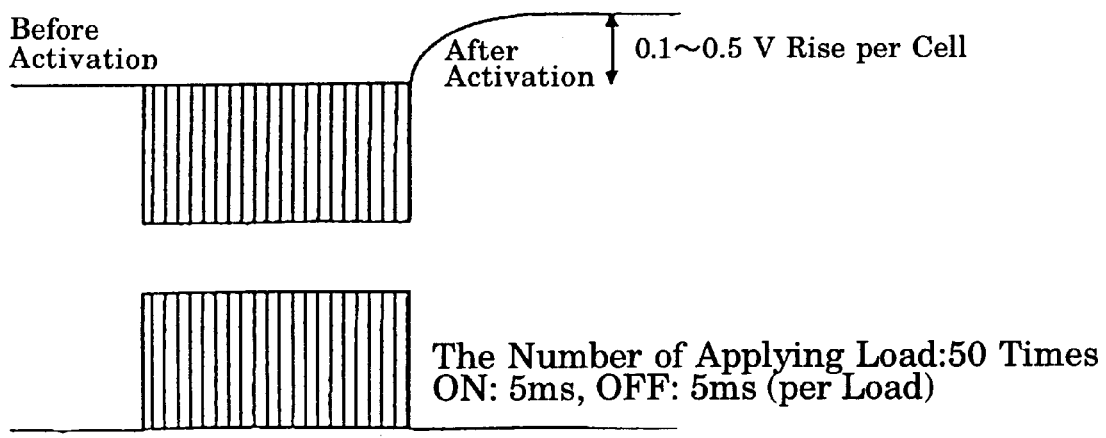
FIG. 9 is a diagram showing the effect of the battery activating operation in the case of alkaline-manganese battery.

In the case of an alkaline-manganese battery AB, the initial output voltage tends to drop largely even though the battery AB still maintains sufficient power if the battery AB is not used for a long period of time. However, if a great amount of current is drawn from the battery AB for more than a predetermined period of time, the output voltage tends to rise (recover) as shown in FIG. 9 (by 0.1 to 0.5 volts per cell specifically). Note that "activating battery" herein means to make the output voltage of the battery whose initial output voltage is low rise by causing the battery to electrically discharge.

In the present embodiment, the number of times the alkaline-manganese battery AB is activated (checked) is predetermined to be fifty as mentioned before, in order to obtain a sufficient activating effect. However, in the case of the lithium battery LB, there is only a slight drop in the initial output voltage, so that the number of times the lithium battery LB is activated (checked) is set to two, much smaller than that of an alkaline-manganese battery AB.

After the operation at step S22 or S23, it is determined at step S24 whether the counter value in the CPU 10 is zero (0). Control proceeds to step S25 if the counter value is not zero, but is returned to the main routine (i.e., proceeds to step S4) if the counter value is zero. The counter value is decreased by one at step S25. Thereafter, at step S26 the output voltage of the battery is indirectly measured by converting the terminal voltage of the first load resistor 22 into a corresponding digital value through the A/D converting circuit 12. The value of the detected output voltage is temporarily stored in a RAM in the CPU 10. This stored value is compared with a reference voltage value which is determined depending on the type of battery used. The reference voltage value is pre-stored in the EEPROM 60.

Figure 6:
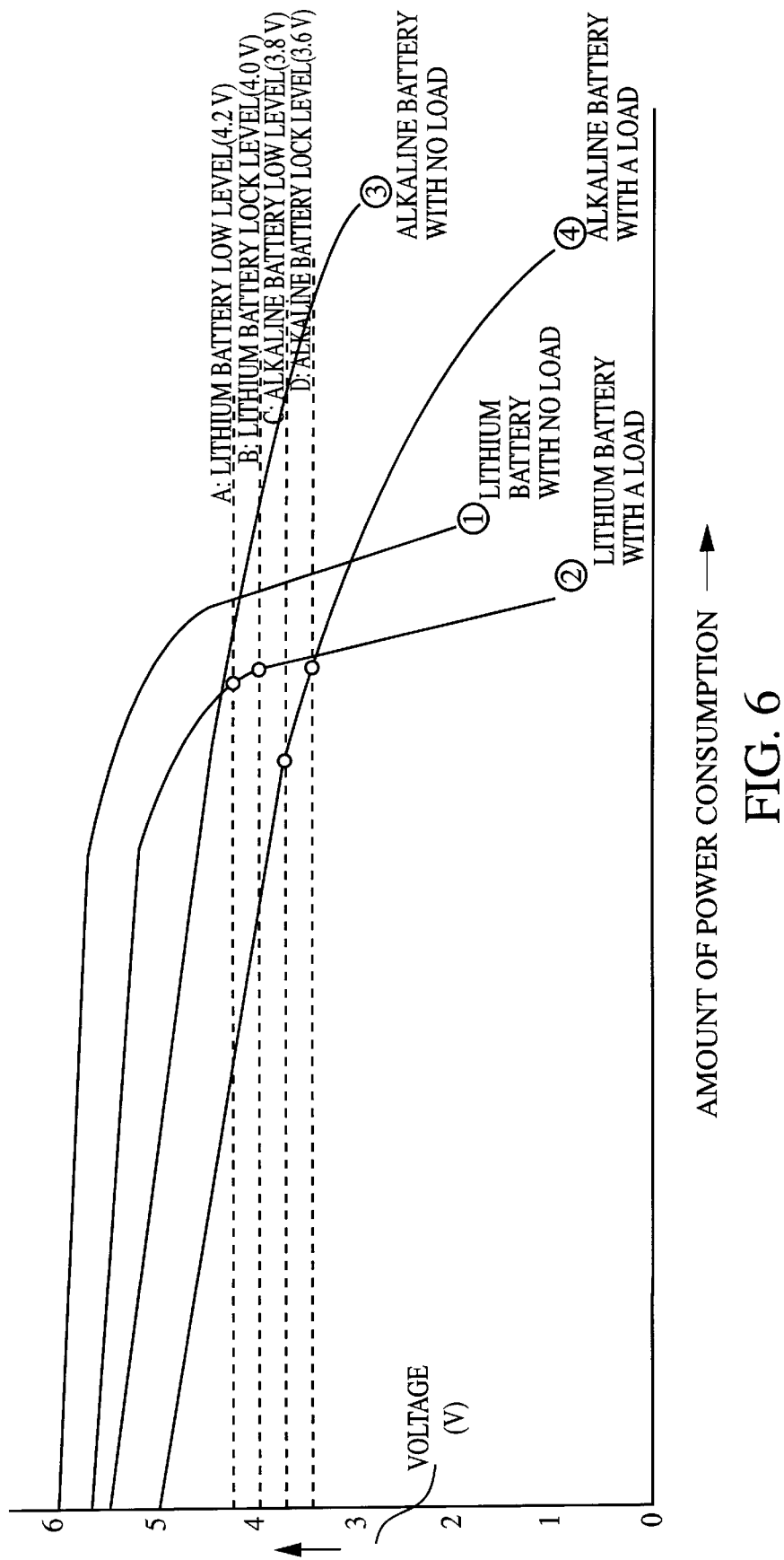
FIG. 6 is a graph showing the relationship between the amount of power consumption and the output voltage in the case of four AA-size alkaline-manganese cells connected in series being used, and two lithium cells connected in series being used.

FIG. 6 is a graph showing the relationship between the amount of power consumption and the output voltage in the case of using four AA-size alkaline-manganese cells connected in series or two lithium cells connected in series. Specifically, line ① represents the relationship between the amount of power consumption and the output voltage when using two lithium cells connected in series when no load is applied to the two lithium cells. Line ② represents the relationship between the amount of power consumption and the output voltage when using two lithium cells connected in series when a load is applied to the two lithium cells. Line ③ represents the relationship between the amount of power consumption and the output voltage when using four AA-size alkaline-manganese cells connected in series when no load is applied to the four AA-size alkaline-manganese cells. Line ④ represents the relationship between the amount of power consumption and the output voltage when using four AA-size alkaline-manganese cells connected in series when a load is applied to the four AA-size alkaline-manganese cells.

As can be seen from the graph shown in FIG. 6, in the case of lithium cells, the output voltage gradually drops when the battery level is high, but suddenly drops once the battery level becomes low. Due to such characteristics, in this particular embodiment, it is determined that the battery level is NORMAL when the detected output voltage is over 4.2 volts, it is determined that the battery level is LOW when the detected output voltage is 4.2 or less than 4.2 volts but over 4.0 volts, and it is determined that the battery level is an EMPTY level when the detected output voltage is 4.0 volts or less.

However, in the case of alkaline-manganese cells, unlike in the case of lithium cells, the output voltage gradually drops as they are consumed rather than suddenly. Due to such characteristics, in the case of using alkaline-manganese cells, it is determined that the battery level is NORMAL when the detected output voltage is over 3.8 volts, it is determined that the battery level is LOW when the detected output voltage is 3.8 (or less than 3.8 volts but over 3.6 volts), and it is determined that the battery level is EMPTY when the detected output voltage is 3.6 volts or less. The reason why the LOW and EMPTY voltage levels of the lithium cells are determined higher than those of the alkaline-manganese cells is to prevent the output voltage of the lithium cells from suddenly dropping before it is determined that the battery level is LOW, since the output voltage of the lithium cells suddenly drops once the battery level of the lithium cells becomes low.

The aforementioned reference values of the output voltages are pre-stored in the EEPROM 60. The CPU 10 compares these reference values input from the EEPROM 60 with the value of the output voltage detected through the A/D converting circuit 12 in accordance with the type of battery used so as to determine the remaining power of the battery (step S27).

After the operation at step S27, if it is determined at step S28 that the battery level is EMPTY (i.e. , in a state of 'battery lock' in which the battery cannot supply a sufficient power to the camera any longer), control returns to step S24 wherein the counter value is further decreased by one so as to activate the battery again.

According to such an operation for activating the battery, even if it is determined at the first time of determining that the battery level is EMPTY, the output voltage of the battery may recover to a LOW or NORMAL level by repeatedly and intermittently applying a load to the battery.

The above-described activating operation on the battery is repeated up to the number of times which has been set in the counter until it is determined by the CPU 10 that the battery level is either LOW or NORMAL (steps S24 through S28).

In the case where the camera is not used for a long period of time, sometimes the metal contacts provided in the battery chamber of the camera oxidize, forming an oxidized layer thereon. With such a oxidized layer, it may be determined by the CPU 10 that the battery level is LOW or EMPTY even if the actual battery level is high. However, according to the present embodiment, a great amount of electric current flows by activating the battery several times, which can reduce or eliminate the oxidized layer to thereby make it possible to accurately measure the battery level.

Figure 4:
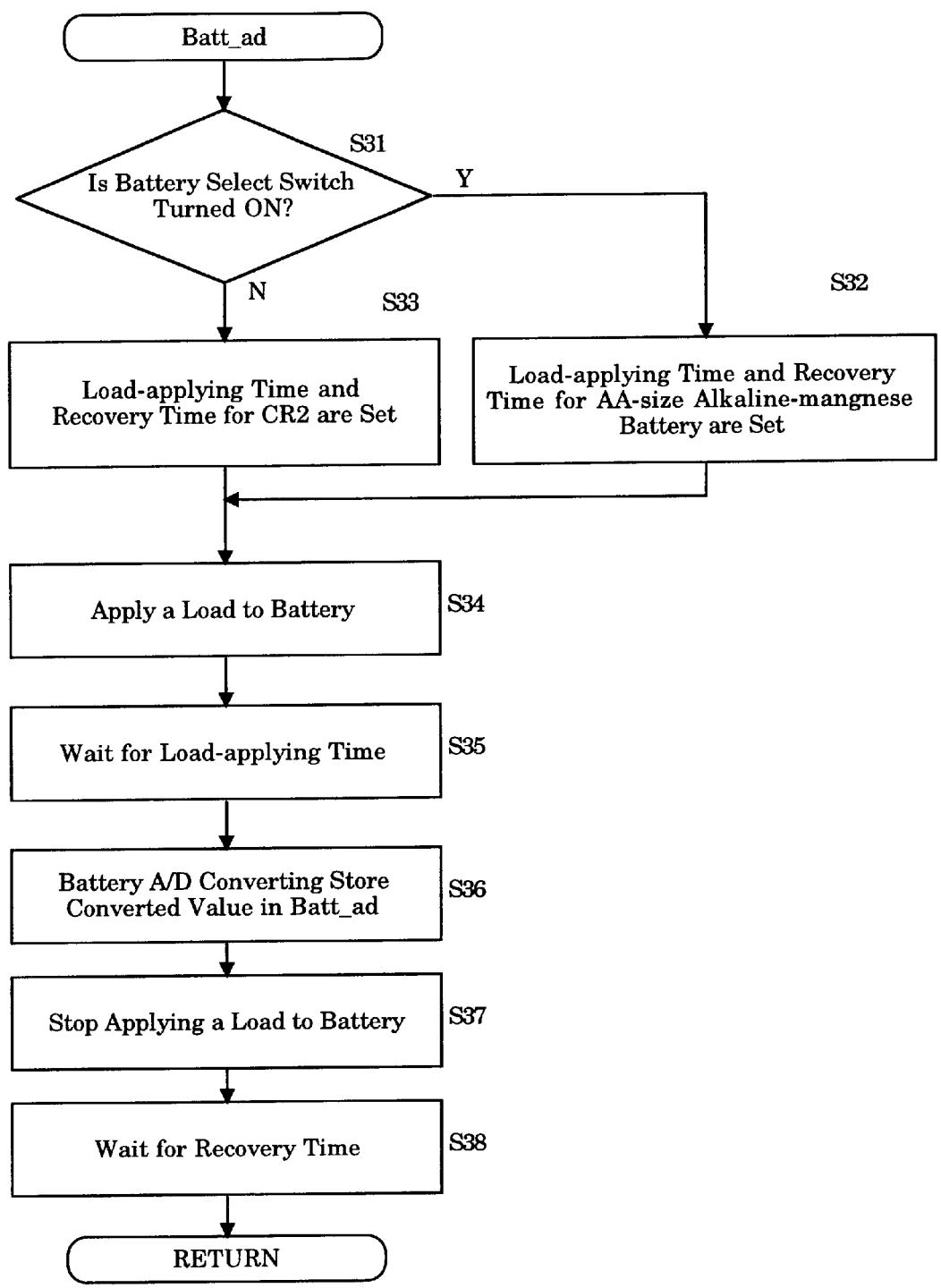
FIG. 4 is a flow chart illustrating the battery A/D converting operation shown in FIG. 3.

FIG. 4 shows a flow chart showing the battery A/D converting operation at step S26 shown in FIG. 3. In this operation it is determined whether the battery select switch 51 is turned ON or OFF (step S31). The time of applying a load to the battery and the recovery time of the battery for the AA-size alkaline-manganese cells which are pre-stored in the EEPROM 60 are set if it is determined at step S31 that the battery select switch 51 is ON, or the time of applying a load to the battery and the recovery time of the battery for the lithium cells which are also pre-stored in the EEPROM 60 are set if it is determined at step S31 that the battery select switch 51 is OFF.

The time of applying a load to the battery described herein refers to means the time of making the detected battery electrically discharge by connecting the battery with the first and second load resistors 21 and 22 by means of a predetermined voltage being applied to the switching transistor 24 by the CPU 10. The recovery time of the battery described herein refers to the time of disconnecting the detected battery from the first and second load resistors 21 and 22 by the switching transistor being turned OFF by the CPU 10. Hence, pulses which are determined according to the time of applying a load to the battery and the recovery time of the battery are applied to the switching transistor 24.

Figure 7:
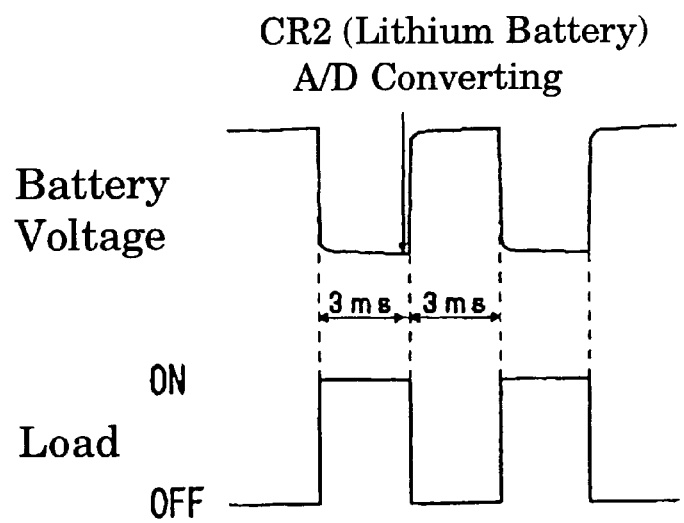
FIG. 7 is a diagram showing the relationship between the output voltage, the load-applying time, and the recovery time of a lithium battery.
Figure 8:
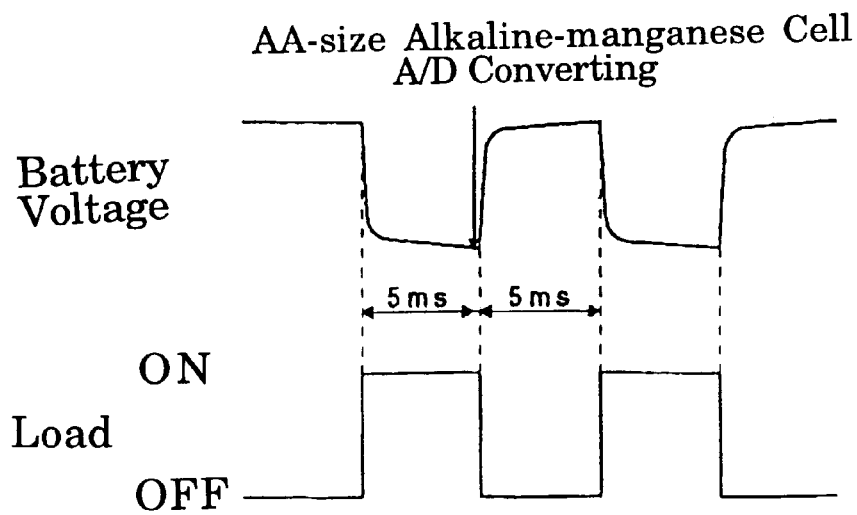
FIG. 8 is a diagram showing the relationship between the output voltage, the load-applying time, and the recovery time of an alkaline-manganese battery.

In this particular embodiment, in the case of using lithium cells, both the time of applying a load to the battery and the recovery time of the battery are predetermined to be three milliseconds (3 ms), as shown in FIG. 7 (steps S31 and S33). On the other hand, in the case of using the alkaline-manganese cells, both the time of applying a load to the battery and the recovery time of the battery are predetermined to be five milliseconds (5 ms), as shown in FIG. 8 (steps S31 and S32).

After the operation at step S32 or S33, the CPU 10 connects the battery with the first and second load resistors 21 and 22 for the aforementioned predetermined load-applying time to detect the terminal voltage of the first load resistor 22 during the load-applying time as a digital value via the A/D converting circuit 12 (steps S34 and S35). Subsequently, the CPU 10 stores the digital value in a RAM therein (step S36). Thereafter the CPU 10 disconnects the battery from the first and second load resistors 21 and 22 for the aforementioned predetermined recovery time to end the A/D converting operation (steps S37 and S38).

Figure 5:
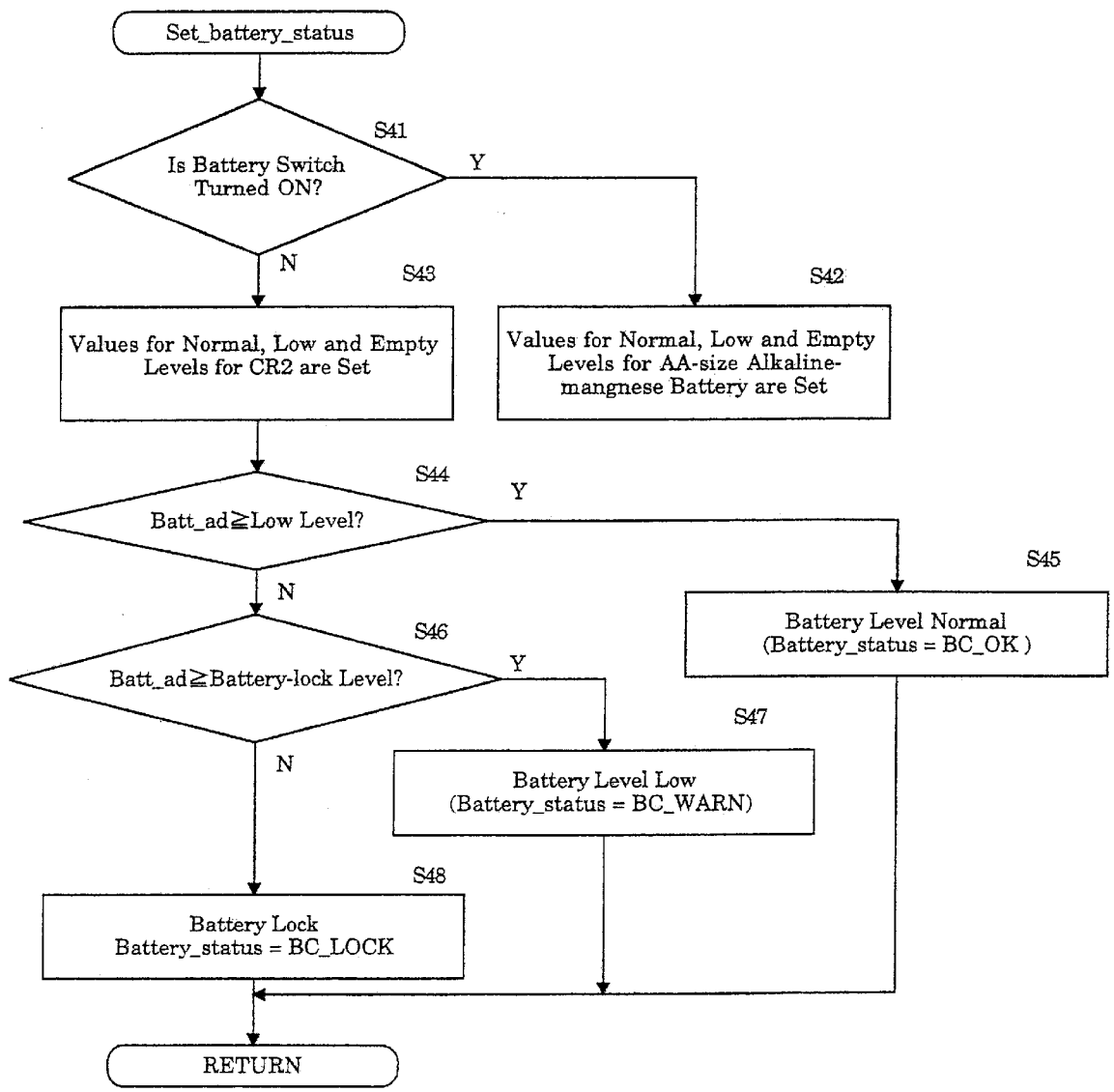
FIG. 5 is a flow chart showing the battery-status setting operation shown in FIG. 3.

FIG. 5 shows a flow chart showing the battery-status setting operation at step S27 of FIG. 3. In this operation it is determined whether the battery select switch 51 is turned ON or OFF (step S41). If it is determined at step S41 that the battery select switch 51 is ON, the first value of voltage for determining that the battery level is NORMAL, the second value of voltage for determining that the battery level is LOW and the third value of voltage for determining that the battery level is an EMPTY level for the AA-size alkaline-manganese cells are all set (step S42). Conversely, if it is determined at step S41 that the battery select switch 51 is OFF, the first value of voltage for determining that the battery level is NORMAL, the second value of voltage for determining that the battery level is LOW and the third value of voltage for determining that the battery level is an EMPTY level for the CR2 lithium cells are all set (step S43).

As mentioned before, in this particular embodiment, when a lithium battery is used, it is determined that the battery level is NORMAL when the detected output voltage is over 4.2 volts, LOW when the detected output voltage is 4.2 (or less than 4.2 volts but over 4.0 volts), and EMPTY when the detected output voltage is 4.0 volts or less. Alternatively, when alkaline-manganese cells are used, it is determined that the battery level is NORMAL when the detected output voltage is over 3.8 volts, LOW when the detected output voltage is 3.8 (or less than 3.8 volts but over 3.6 volts), and EMPTY when the detected output voltage is 3.6 volts or less.

The CPU 10 compares the set reference voltage values with the value of the output voltage detected through the A/D converting circuit 12 in accordance with the type of battery used, so as to determine that the battery level is NORMAL if the detected voltage value is over the LOW level (steps S44 and S45), or the battery level is LOW if the detected voltage value is at the LOW level (steps S46 and S47). If the detected voltage value is below the LOW level, it is determined that the battery level is EMPTY (step S48).

As can be understood from the foregoing, according to the present embodiment of the battery power residual-quantity checking apparatus, it is determined which battery is selected by checking the ON/OFF state of the battery select switch 51, while the battery level is determined using the time of applying a load to the battery, the recovery time of the battery and the number of times of activating battery, which are all predetermined depending on the battery types (i.e., a lithium battery or an alkaline-manganese battery).

In the aforementioned embodiment, the battery level is checked when the release button is half depressed. However, the present invention is not limited solely to this particular embodiment. The battery level can be checked at any other time. For instance, the battery level can be checked when the main switch of the camera is turned ON, or when a new film is loaded in the camera.

Furthermore, all the aforementioned predetermined values or times, i.e., the time of applying a load to the battery, the recovery time of the battery, the number of times the battery is activated (checked), and the respective values of voltages for determining the battery level can be any other values, depending on the types of batteries used for the camera.

The aforementioned embodiment is constructed for the case where only two types of batteries are selectively used; however, the construction can include more than two types of batteries which can be selectively used.

Figure 10:
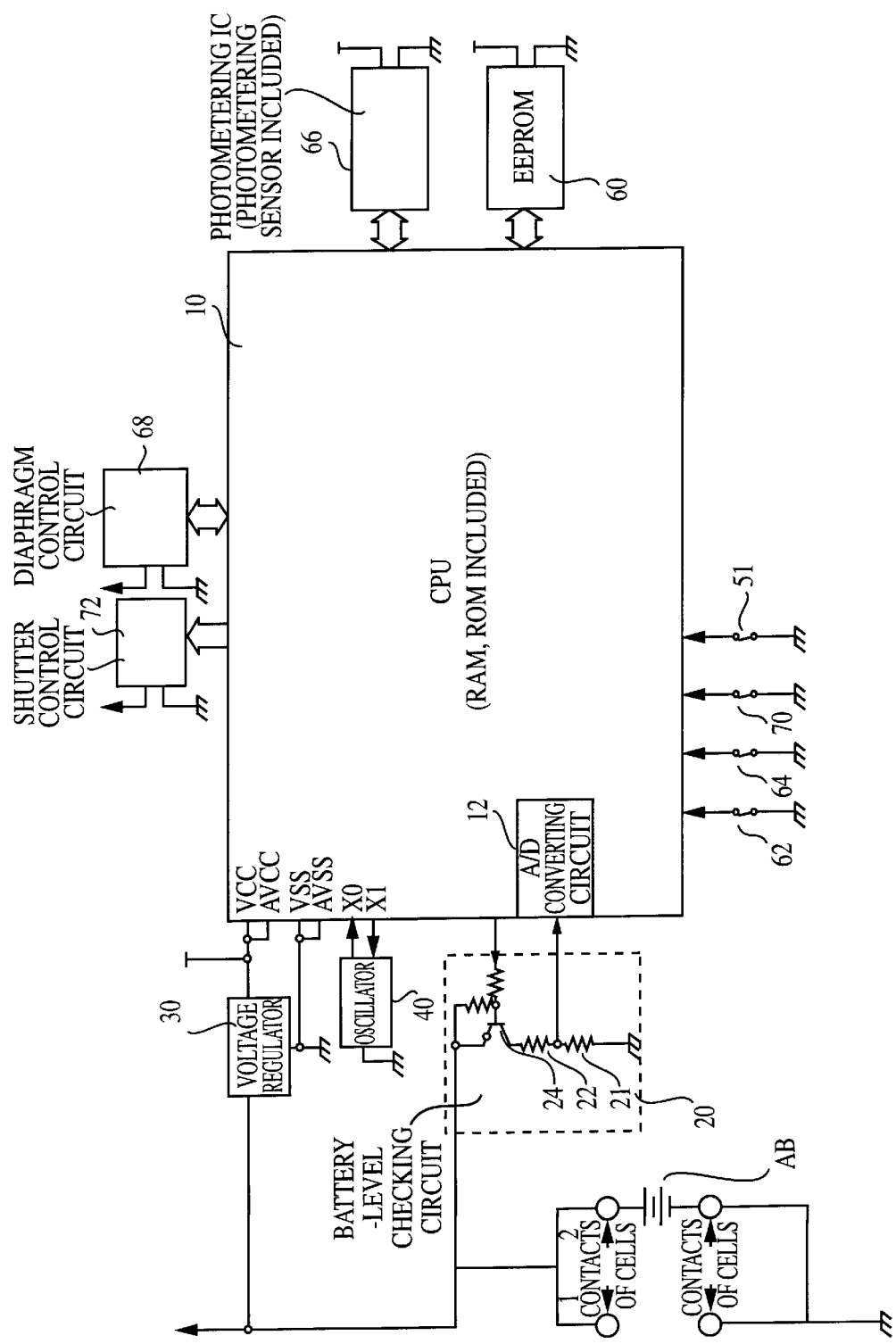
FIG. 10 is a block diagram, similar to FIG. 1, of another embodiment which has a removable battery pack which receives a battery, showing a state when the battery pack having an alkaline-manganese battery is accommodated into a camera body.
Figure 11:
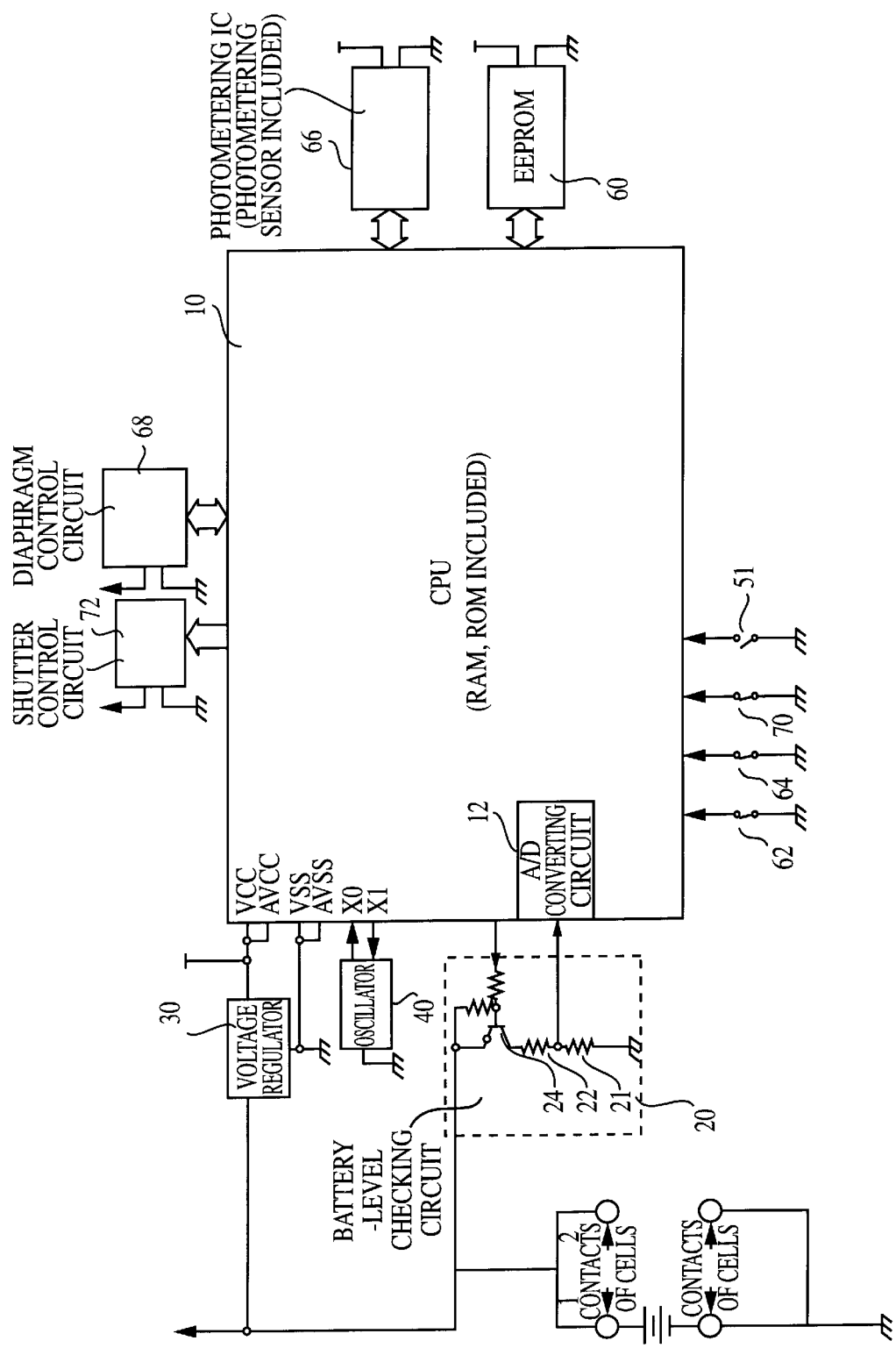
FIG. 11 is a block diagram of the embodiment shown in FIG. 10, showing a state when a battery pack having a lithium battery is accommodated into the camera body.

Moreover, in the embodiment shown in FIG. 1, a construction is shown where both an alkaline-manganese battery and a lithium battery are loaded into the camera at the same time. However, a removable battery pack can be provided in the camera body according to the type of battery used. For example, a discriminating member can be provided which switches the battery select switch 51 ON via a claw (etc.) when a battery pack having an alkaline-manganese battery loaded therein is loaded into the camera body (FIG. 10); or alternatively, switches the battery select switch 51 ON when the battery pack which is loaded into the camera body has a lithium battery loaded therein (FIG. 11).

Furthermore, in the embodiments shown in the drawings, the construction only allows for two types of batteries to be loaded and selected; however, a construction wherein three or more types of batteries can be loaded, and wherein battery selection can be carried out according to the type of battery loaded therein, is also possible.

As can be understood from the foregoing, since a load determined to correspond to a detected battery is applied to the detected battery and the remaining power of a detected battery is measured in accordance with the output voltage measured by the voltage measuring device and the type of said detected battery, the remaining power of any one of different types of batteries can be accurately measured.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A battery residual-power checking apparatus comprising:
    a detecting device for detecting a type of battery accommodated in a camera a battery from a plurality of battery types prepared in advance;
    a load applying device for applying a load to said detected battery, a magnitude of said load being determined in advance in accordance with the type of said detected battery;

a voltage measuring device for measuring an output voltage of said detected battery while said load applying device applies said load to said detected battery; and a battery residual-power determining device for determining the remaining power of said detected battery in accordance with said output voltage measured by said voltage measuring device and the type of said detected battery.

2. The battery residual-power checking apparatus according to claim 1, wherein if said battery residual-power determining device determines that said detected battery has run out of power, said load applying device intermittently applies a predetermined load which is set according to the type of battery detected, wherein if the battery level is determined as being empty before the predetermined maximum number times for the load to be applied is attained, the load being applied is stopped; otherwise, the load is applied until the predetermined maximum number of times for the load to be applied is attained.

3. The battery residual-power checking apparatus according to claim 1, wherein said load applying device comprises:

a pulse generator for generating a first pulse which corresponds to a load applying time for applying said load to said detected battery by said load applying device and a second pulse which corresponds to a recovery time of said detected battery, wherein said load applying time and said recovery time are determined in advance in accordance with the type of said detected battery;

at least one load resistor;

a switching device for connecting said detected battery with said at least one load resistor in accordance with said first pulse, and for disconnecting said detected battery from said at least one load resistor in accordance with said second pulse, according to the type of said detected battery.

4. The battery residual-power checking apparatus according to claim 1, wherein said voltage measuring device measures a terminal voltage of said at least one load resistor while said detected battery is connected with said at least one load resistor, and wherein said battery residual-power determining device determines said remaining power of said detected battery in accordance with said measured terminal voltage.

5. The battery residual-power checking apparatus according to claim 3, wherein if said battery residual-power determining device determines that said detected battery has run out of power, said pulse generator alternately generates said first pulse and said second pulse repeatedly for a predetermined number of times in accordance with the type of said detected battery, in order for the battery residual-power determining device to confirm whether the detected battery has run out of power.

6. The battery residual-power checking apparatus according to claim 3, wherein durations of said first pulse and said second pulse are determined in accordance with the type of said detected battery.

7. The battery residual-power checking apparatus according to claim 1, said battery residual-power checking apparatus being incorporated in a camera having a photometering device;

wherein said camera comprises a switch which operates said photometering device when said switch is turned ON, and wherein said battery residual-power checking apparatus starts operating when said switch is turned ON.

8. The battery residual-power checking apparatus according to claim 1, said battery residual-power checking apparatus being incorporated in a camera, wherein said battery residual-power checking apparatus starts operating when a power switch of said camera is turned ON.

9. The battery residual-power checking apparatus according to claim 1, said battery residual-power checking apparatus being incorporated in a camera, wherein said battery residual-power checking apparatus starts operating when a release switch of said camera is half depressed.

10. A camera having a battery residual-power checking apparatus, wherein more than one type of battery being accommodated in said camera, said battery residual-power checking apparatus comprising:

a battery selecting device for detecting a type of battery accommodated in said camera;

a load applying device for alternately connecting and disconnecting said battery detected by said battery selecting device with at least one load resistor repeatedly by a predetermined number of times, which is determined in accordance with the type of said detected battery;

a voltage measuring device for measuring a terminal voltage of said at least one load resistor while said detected battery is connected with said at least one load resistor; and a battery residual-power determining device for determining the remaining power of said detected battery in accordance with said terminal voltage and the type of said detected battery.

11. A camera having a battery residual-power checking apparatus, wherein a removable battery pack is provided according to the type of battery loaded into said camera, said battery residual-power checking apparatus comprising:

a selecting device which selects the type of battery which has been loaded into said battery pack in said camera;

a loading applying device for applying a load to a battery loaded into said battery pack according to a predetermined load set for said type of battery detected by the selecting device;

a voltage measuring device for measuring a terminal voltage of at least one load resistor while said detected battery is connected with said at least one load resistor; and a battery residual-power determining device for determining the remaining power of said detected battery in accordance with said terminal voltage and said type of detected battery.

* * * * *